Figure 4:
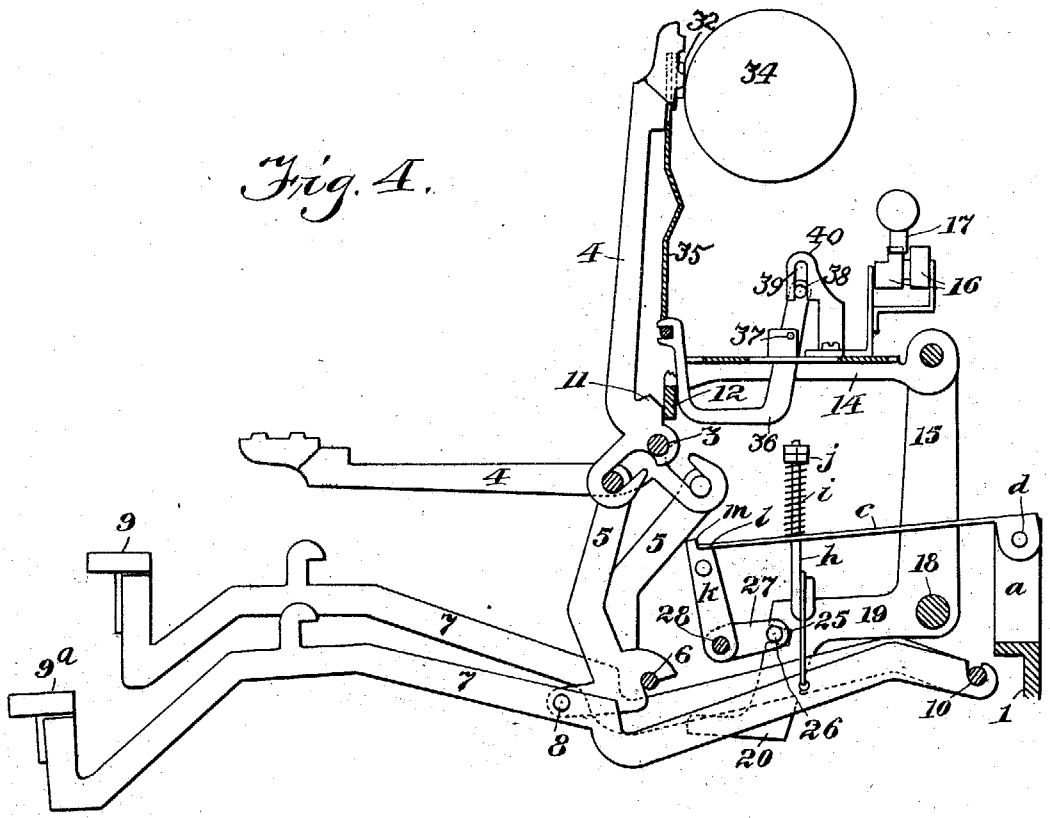

No. 12,465. REISSUED MAR. 27, 1906.
F. X. WAGNER.
TYPE WRITING MACHINE.
APPLICATION FILED JUNE 9, 1904.
3 SHEETS—SHEET 1.
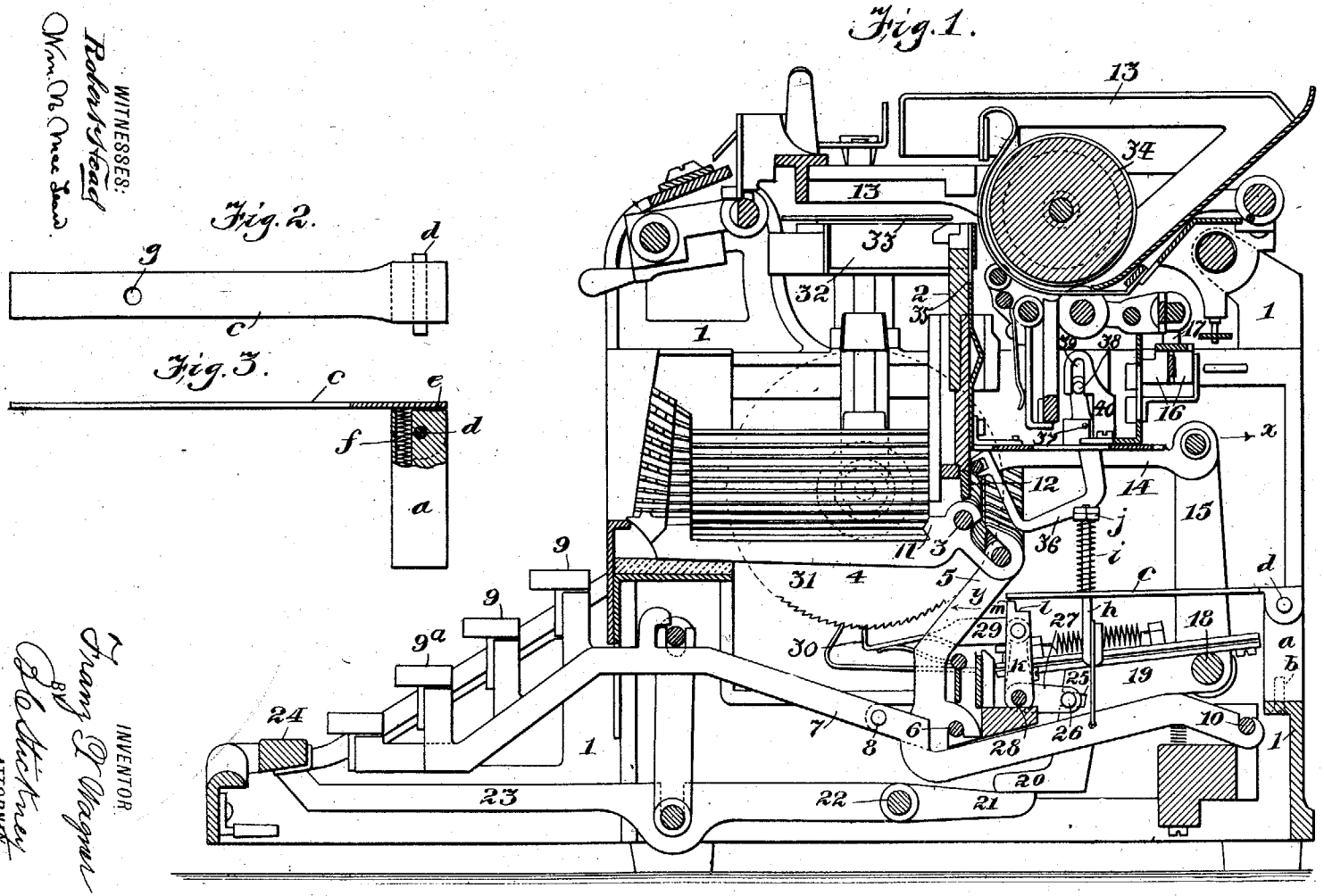
WITNESSES:
Robert Head
Wm. M. MacLean
INVENTOR
Franz X. Wagner
BY
B. E. Stickney
ATTORNEY No. 12,465. REISSUED MAR. 27, 1906.

F. X. WAGNER.

TYPE WRITING MACHINE.

APPLICATION FILED JUNE 9, 1904.

3 SHEETS—SHEET 2.

WITNESSES:
Robert Stead
Wm. C. MacLean

INVENTOR
Franz X. Wagner
BY
B. C. Stickney
ATTORNEY

No. 12,465. REISSUED MAR. 27, 1906.

F. X. WAGNER.

TYPE WRITING MACHINE.

APPLICATION FILED JUNE 9, 1904.

3 SHEETS—SHEET 3.

WITNESSES:
Robert Stead
Wm. McMacLean

INVENTOR
Franz X Wagner
BY
B. Stickney
ATTORNEY

UNITED STATES PATENT OFFICE.

FRANZ X. WAGNER, OF NEW YORK, N. Y., ASSIGNOR, BY MESNE ASSIGNMENTS, TO UNDERWOOD TYPEWRITER COMPANY, OF NEW YORK, N. Y., A CORPORATION OF NEW JERSEY.

TYPE-WRITING MACHINE.

No. 12,465. Specification of Reissued Letters Patent. Reissued Mar. 27, 1906.

Original No. 660,231, dated October 23, 1900. Application for reissue filed June 9, 1904. Serial No. 211,374.

*To all whom it may concern:*

Be it known that I, FRANZ X. WAGNER, a citizen of the United States, residing in the borough of Manhattan, city, county, and State of New York, have invented certain new and useful Improvements in Type-Writing Machines, of which the following is a full, clear, and exact description.

My invention relates principally to that class of writing-machines known as "visible" writers, in which it is usual to vibrate the ribbon to cover and uncover the printing-point at each type impression, whereby the type is enabled to make an impression through the ribbon and the latter is immediately and automatically withdrawn, so as to disclose the written letters.

The invention relates particularly to means in machines of this class for accenting or underscoring letters. One of the types is provided with a suitable accent-mark, and the key controlling this type is first struck, and then is struck another key to print the letter which it is desired to accent. The accent type-key omits to cause the usual letter-feeding movement of the paper-carriage, so that by striking the accent-key first and then the ordinary key the letter and its accent are caused to register properly upon the written sheet. Such an accent type-key is sometimes called a "blank" key, because it omits to feed the carriage. The striking of the ordinary type-key of course causes the carriage to feed as usual, so that the letters may appear in proper sequence upon the page.

In the class of visible writers means common to all of the type-keys are usually provided for both feeding the carriage and vibrating the ribbon to cover the printing-point. Usually the keys are adapted to operate a universal bar, which in some kinds of machines is in the form of a curved bar mounted just in rear of the type-bars and movable rearwardly by means of heels formed upon the type-bars, and by means of said universal bar the ribbon is vibrated and the carriage is fed. The gist of my invention resides in causing the accent-key or blank key to vibrate the ribbon without feeding the carriage, so that the accent-mark may be properly printed while the carriage is held until the ordinary type is printed in proper relation to the accent-mark.

In the form of my invention illustrated the ribbon-vibrator may be operated in the usual manner by the universal bar and the latter may be operated as usual by all the type-keys, including the accent type-key; but the latter also controls means for preventing the carriage from being fed as usual by such operation of the universal bar. A lock or detent controlled by the accent-key prevents the usual return movement of the universal bar and carriage-feeding mechanism, so that the carriage is not released for a feeding movement. Said lock is normally idle, but is capable of being set to effective position by the said accent-key. Provision is also made for enabling any subsequently-operated ordinary type-key, as well as the usual spacing-key, to release said lock, so that the carriage may feed as usual.

The illustrated form of the invention also embodies certain novel features of construction, arrangements of parts, and combinations of devices, as will be hereinafter described, and particularly pointed out in the concluding claims.

In the accompanying drawings my invention is shown upon the well-known Underwood type-writing machine, to which said invention is specially adapted, though obviously it may be used in other styles of visible-writing machines, and the necessary changes in detail of construction for the adaptation of the invention to other machines will readily occur to those skilled in the art.

Figure 5:
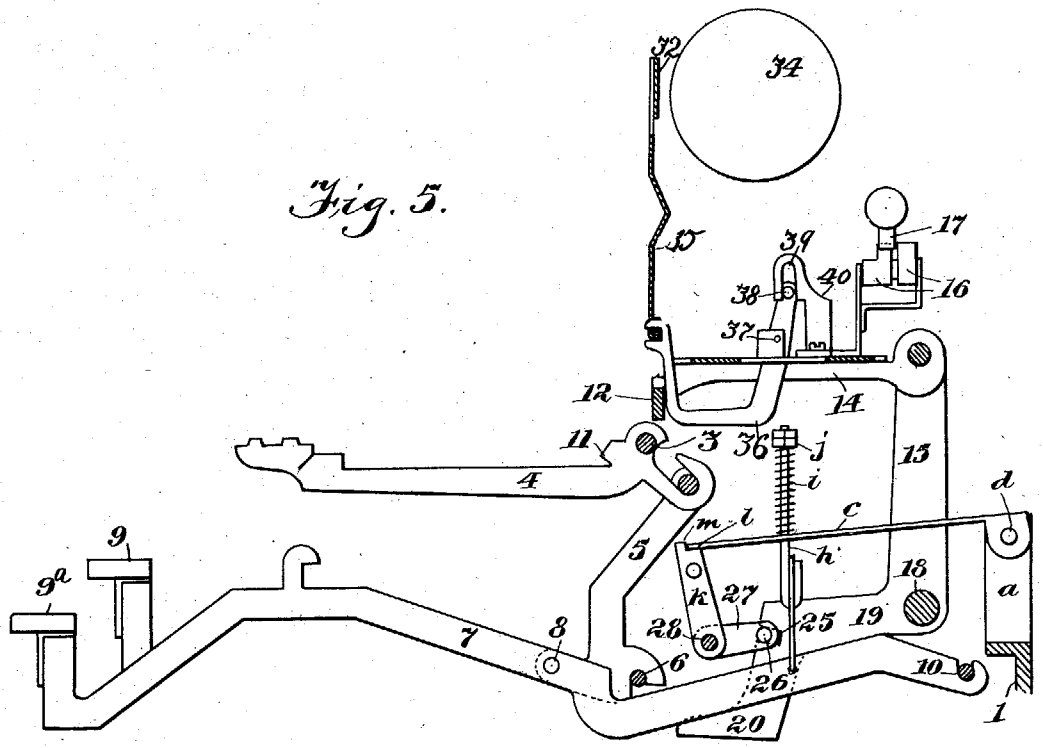

Figure 1 represents a transverse vertical sectional view of a machine embodying my invention, the section being taken about centrally through the machine from front to rear thereof, the parts being in normal position. Fig. 2 is a detail plan view of a lock or detent controlled by the accent type-key for preventing the feeding of the carriage. Fig. 3 is a side view of the same with parts broken away for the purpose of better illustration. Fig. 4 is a skeleton view similar to Fig. 1, but showing one type-bar (the one that carries the accent-type) in printing position, its key depressed, and associated parts moved correspondingly from normal position, an ordinary type-bar being also shown in normal position. Fig. 5 illustrates the locking dog or detent in effective position after the return of the accent-key to normal position.

In the several views like parts are identified by like signs.

1 designates the framing of the machine, in which is mounted a segmental plate 2. This plate 2 carries a pivot-rod 3, upon which the type-carriers or type-bars 4 are pivotally mounted. Each of the type-bars 4 is connected to a bell-crank 5, pivoted at 6 to the framing of the machine and pivotally united to a key-lever 7, as indicated at 8. The key-levers 7 are provided with the usual finger-keys 9 and are pivoted at 10 to the framing of the machine. Each of the type-bars is provided with a heel 11, which abuts against a universal bar 12 during the movement of the type-bar up to the printing-point, whereby a rearward movement is given to the universal bar, which usually is formed or shaped to conform to the curvature of the type-bar system, whereby all of the type-bar heels may operate the universal bar. The carriage-feeding mechanism or escapement is connected to this universal bar, and each complete movement of the latter causes the platen-carriage 13 to be fed one space in the usual manner. During the printing stroke of any type-bar the universal bar is moved back, as at Fig. 4, and during the return movement of any of the ordinary type-bars said universal bar returns to normal position, the movement of the universal bar thus being reciprocatory. In the present instance the carriage-feeding mechanism comprises a table 14, which at its forward end is connected to the universal bar and at its rear end is connected to crank-arms or links 15. Said table carries feeding-dogs 16, which successively or alternately engage a rack 17, mounted upon the carriage, so as to effect an escapement or feed of the carriage at each reciprocation of the universal bar—that is, at each complete lateral movement of the feed-dogs to and from their initial position. It will be understood, of course, that the carriage is fed upon the second or return stroke of the dogs and universal bar—that is, that the carriage remains motionless during the first or rearward stroke of said parts. The arms 15, hereinbefore referred to, are rigidly connected to a rock-shaft 18. A forwardly-projecting arm 19 is also secured to said rock-shaft, said arm being provided with a downward and forward extension 20. Against the under side of said extension is adapted to bear an upwardly-movable crank-arm 21, the latter being fixed upon and projecting rearwardly from a rock-shaft 22, which is mounted in the framing of the machine and from which extend forwardly spacing-levers 23, carrying at their forward ends the usual spacing-key 24. By depressing the spacing-key the arms 23 are carried down, the arm 21 elevated, thereby through the arm 19 rocking the shaft 18 and the arms 15, which draw back the table 14, together with the dogs 16, and upon relief of the spacing-key from pressure the parts return to normal position, during which return movement the dogs cause or permit the carriage to advance one step. Said arm 19 is provided with a slot 25, into which takes a pin 26, the latter projecting from a crank-arm 27, that is rigidly connected to a rock-shaft 28, and the latter is provided with ribbon-feeding arms 29, each of said arms being provided with a pawl 30, that coöperates with a ratchet-wheel 31, and each of said ratchet-wheels being connected up in a suitable manner to the ribbon-spools, upon which the ribbon 32 is carried. Said ribbon-spools are designated as 33 and are mounted forwardly of the platen 34 in such a manner that the types may strike through the length of ribbon that reaches across in front of the platen from spool to spool. The writing is visible as it proceeds, because after each impression the ribbon drops. For elevating and dropping the ribbon at each type operation a slide or vibrator 35 is employed, said vibrator being just in front of the platen and in the vicinity of the printing-point and carrying the ribbon up and down. Normally it stands in its lowest position, as at Fig. 1; but when any key is operated it is lifted so as to interpose the ribbon between the type and the paper, as will be understood from Fig. 4. Said vibrator is controlled by an arm 36, pivoted at 37 upon a fixture and provided with a pin 38, whereby it is vibrated, said pin 38 engaging a slot 39, formed in an arm 40, upstanding from the table 14, whereby the backward and forward movements of the table cause the arm 36 to vibrate, and thereby lift and drop the ribbon vibrator or carrier 35. As before explained, said table 14 is connected to the universal bar 12, and hence the universal bar effects the lifting of the ribbon at each type-stroke.

So much of the mechanism as has thus far been described constitutes mechanism of the well-known Underwood type-writing machine and is well adapted for use in practicing my invention. I will now proceed to describe the remaining devices of the mechanism, with which coöperate the devices already described, to carry out the purposes of my invention. Said remaining devices comprise principally a detent or lock whereby the accent type-key (or blank key) may prevent the full return movement of the carriage-feeding dogs, and hence prevent the carriage from feeding; but I do not wish to be understood as intending to mean that my invention consists in merely adding these few remaining parts, since so far as the broad features of the invention are concerned it is immaterial whether it be practiced in an Underwood or some other type of machine, and all of the carriage-feeding and ribbon-vibrating mechanism may be varied widely within the scope of the present invention. My invention, broadly considered, comprises as an element a ribbon-vibrating mechanism operable by all of the type-keys, including the accent type-key, and while I find it convenient to illustrate the invention in an Underwood machine still it is not limited thereto.

Shown at the rear portion of the machine and secured upon the framing 1 is a bracket, support, or carrier *a*, which is attached by means of a screw *b*. This support *a* may be secured to any portion of the framing in the machine adjacent to any of the key-levers in the machine. In the present instance it is located immediately in rear of one of the key-levers 7. Pivoted upon said support *a* and extending forwardly therefrom is what I term a "locking-dog" *c*, the pivot being indicated at *d*. Said locking-dog is capable of a slight downward movement upon its pivot, which movement may be limited by the dog striking the top surface *e* of the support *a*. The locking-dog is normally maintained in its elevated position, Figs. 1 and 3, by a spring *f*, located within the support *a* and bearing up against said locking-dog. The function of the locking-dog, as will presently be explained, is to prevent feeding of the carriage when an accent or blank type-key is struck. In its normal elevated position said locking-dog *c* is ineffective; but it may be set or depressed to effective position by means of a rod *h*, which is connected at its lower end to any of the key-levers which is to constitute what I term a "blank" key-lever or key, such blank key-lever being connected to the accent-type and being termed "blank" because it effects no feed of the carriage, as do the other type-keys. Said rod *h* extends up through an aperture *g* in the locking-dog, and surrounding its projecting end above the locking-dog is a coiled spring *i*, the lower end of which bears upon the dog and the upper end of which bears against a nut or nuts *j*, by which the tension of the spring may be adjusted. In the normal position of the parts there is practically no tension exerted by the spring *i* upon the locking-dog; but when the blank key is depressed it pulls down the rod *h* and by means of the nut *j* thereon said spring is placed under tension sufficient to overcome the resistance of the dog-supporting spring *f*, and hence said locking-dog is forced down. The free or forward end of this locking-dog is adapted to coöperate with a locking-abutment *k*, which is carried upon the rock-shaft 28 and is provided at its upper end with a notch *l*. Normally the spring *f* maintains the locking-dog above said locking-abutment, Fig. 1, so that ordinarily there is nothing to prevent the rocking of the shaft 28 or the corresponding movements of the universal bar 12, and hence there is no interference with the feeding of the carriage unless the blank key is operated.

Upon the depression of any one of the ordinary type-keys 9 the lever 7 is forced down, vibrating the bell-crank 5 and swinging the type-bar 4 up to print. The heel 11 on the type-bar forces back the universal bar 12 together with the table 14, (as shown by arrow *x*,) and the arm 40 upon the latter vibrates the pivoted arm or lever 36, and the latter in turn elevates the ribbon carrier or vibrator 35, whereby the ribbon is caused to cover the printing-point at the moment when the blow of the type is delivered upon the platen. At the same time the carriage-feeding dogs 16 move rearwardly, without, however, permitting the carriage to advance, since the latter ordinarily remains stationary in order to receive the type impression in the proper position upon the paper. Upon the relief of the ordinary type-key from pressure the key-lever, bell-crank, type-bar, and universal bar return to normal position. During such return movement of the universal bar the ribbon-vibrator drops, so as to expose the writing, and the dogs 16 move forwardly and permit the carriage to feed. This operation is repeated as the keys are struck in succession. At each reciprocation of the universal bar and table 14 the arms 15 are vibrated and through arms 19 and 27 the shaft 28 is rocked, whereby arm 29 upon said shaft is rocked, and through the pawl 30 and ratchet-wheel 31 the ribbon is fed longitudinally. It will be understood also that the arm *k*, fixed upon said shaft 28, also rocks forwardly (as shown by the arrow *y*) at each depression of a type-key and rearwardly upon the upstroke of the key, such movement of the arm *k*, however, being an idle one during the usual operation of the ordinary keys. At the operation of the accent or blank key 9ª its type-bar is swung up to print, the rearward movement of the universal bar is effected, the ribbon-vibrator lifted, the arms 15 rocked rearwardly, the arms 19 and 27 moved upwardly, and the shaft 28 rocked, together with the arms 29 and *k* thereon, and by the movement of the said arm *k* the notch *l* therein is swung forwardly to permit the locking-dog *c* to drop thereinto, this downward movement of the locking-dog being effected by the spring *i*, which, of course, is compressed by the downward pull of the rod *h*, occasioned by the downward movement of the key-lever to which it is attached. This position of the parts is illustrated at Fig. 4. The accent-mark provided upon the type is impressed upon the paper. The positioning of the accent-mark upon its type-bar will of course depend upon the character of the mark and the position it is to occupy with relation to the letter to be written. Upon the relief of the accent type-key 9ª from pressure it returns to normal position, together with its type-bar; but the several parts of the ribbon-vibrating, carriage-feeding, and ribbon-feeding mechanism do not return to normal position and naturally the carriage does not feed, because of the engagement of the locking-dog *c* with the nose *m* of the locking-abutment *k*, Fig. 5, which holds the parts *k*, 28, 27, 19, 15, 14, and 16 from returning to normal position. The depression of the blank key having made the imprint of the accent-mark upon the paper adjacent to the letter to be accented and having automatically locked the carriage-feed mechanism out of operation, the desired letter which is to coöperate with the accent-mark is then written. A movement or depression of the selected writing-key or type-key, which causes an imprint of the desired letter, will at the last portion of the printing stroke of the type-bar produce a slight movement of the feed mechanism in the direction of the arrow *x* in the manner hereinbefore described, and this movement will cause the locking-dog *c* to be freed from the nose *m* of the locking-abutment, and the locking-dog being thus released is elevated to normal position by its spring *f*, it being understood that at this time the spring *i* is not under tension and affords no resistance to the upward or return movement of the locking-dog to ineffective position. It will thus be seen that a movement of the blank key causes the ribbon to cover the printing-point and an imprint of the accent-mark to be made through the ribbon upon the paper or platen and simultaneously locks the carriage-feed mechanism out of operation and that a depression of any of the writing-keys will then cause an imprint to be made in the same space that the accent-mark has been imprinted, or, in other words, in proper register with the accent-mark. At the same time an automatic release of the feed mechanism will be effected, so that the operator may proceed with the writing in the usual manner. It will likewise be observed that the locking of the feed mechanism out of operation during the imprint of the accent-mark and the character which coöperates therewith and the releasing of the feed mechanism immediately after such character is written is effected automatically. It will also be oberved that movement of all parts of the carriage-feeding mechanism is effected when the spacing-key 24 is depressed. The depression of the spacing-key causes the arm 21 to be elevated, thereby shifting the parts of the carriage-feed mechanism in the manner described by reason of the coöperation of the arm 21 with the extension 20.

While I have described with considerable detail a construction embodying my invention, I am aware that various changes may be made without departing from the spirit of my invention. Thus while I have shown the locking mechanism so constructed as to be operated in part by the mechanism which directly effects the feed of the ribbon, but which is nevertheless controlled and operated by the feeding mechanism, it is obvious that this movement of the parts may be effected from any portion of the carriage-feed mechanism.

Having thus described my invention, I claim—

1. In a type-writing machine, the combination of a series of type-bars one of which carries an accent-type, a carriage, a series of keys for operating the type-bars, a universal bar operable by the keys, carriage-feeding devices controlled by said universal bar, means also controlled by said universal bar for moving the ribbon to cover and uncover the printing-point at each impression, and means under the control of the accent type-key for preventing a feeding movement of said carriage.

2. In a type-writing machine, the combination of a series of type-bars one of which carries an accent-type, a carriage, a ribbon-vibrator, keys connected to the type-bars, means for enabling each of the keys except the accent type-key to effect feeding movements of the carriage, and means for enabling all of the keys to move said vibrator to cause the ribbon to cover the printing-point at each impression.

3. In a type-writing machine, the combination with types, keys, a carriage, and a ribbon-vibrator, of a universal bar operable by the keys and having means for operating said ribbon-vibrator, carriage-feeding devices operable by said universal bar, and means controlled by one of the type-keys for preventing the movement of the universal bar from effecting a feeding movement of the carriage.

4. In a type-writing machine, the combination with types, type-keys, and a carriage, of a universal bar operable by the type-keys, a ribbon-vibrator operable by said universal bar, carriage-feeding devices also operable by said universal bar, and a detent operated by one of the type-keys and controlling one of said universal-bar and carriage elements, for preventing the feed of the carriage at the operation of said key.

5. In a type-writing machine, the combination with types, type-keys, and a carriage, of carriage-feeding mechanism controlled by the type-keys, a detent capable of being set by one of said type-keys in position to prevent the carriage from feeding, means for enabling any of the remaining type-keys to release said detent, and a ribbon-vibrator operable by all of said type-keys.

6. In a type-writing machine, the combination with types, type-keys, and a carriage, of a ribbon-vibrator operable by any of said type-keys, a carriage-feeding mechanism controlled by the type-keys, and a detent for preventing the feeding movement of the carriage; said detent being capable of being set to effective position by one of the type-keys and releasable by the remaining type-keys.

7. In a type-writing machine, the combination with types, type-keys, and a carriage, of a carriage-feeding reciprocatory universal bar operable by the type-keys, a ribbon-vibrator operable by said universal bar, a detent set by one of said type-keys and arresting the universal bar near the initial portion of its return movement, so that the carriage does not feed, and a spring releasing said detent upon the movement of the universal bar by a succeeding key.

8. In a front-strike writing-machine, the combination with types, type-keys, and a carriage, of a ribbon-vibrator operable by all of said keys, a normally ineffective carriage detent or lock, means for enabling one of said type-keys to set said detent to effective position, and means for enabling a subsequent stroke of any of the other type-keys to release said detent.

9. In a front-strike writing-machine, the combination with types, type-keys and a carriage, of a carriage detent or lock which one of said type-keys is capable of setting but incapable of releasing and others of said type-keys are capable of releasing but incapable of setting, and a ribbon-vibrator controlled by all of said keys.

10. In a front-strike writing-machine, the combination with a system of rearwardly-striking type-bars and a carriage, of a universal bar, a system of keys for operating the type-bars and the universal bar, a ribbon-vibrator movable by the universal bar, and means for enabling all except one of said keys to effect feeding movements of said carriage.

11. In a front-strike writing-machine, the combination with a system of rearwardly-striking type-bars and a carriage, of a system of keys connected to said type-bars, a universal bar operable by said type-bars, a ribbon-vibrator movable by the universal bar, carriage-feeding devices controlled by the universal bar, and means controlled by one of said keys for preventing the feeding movement of the carriage.

12. In a device of the character specified, the combination of a carriage, feed mechanism therefor, a "blank" key, means controlled by said "blank" key for locking the feed mechanism out of operation; a system of types, one of which is controlled by said "blank" key; said key forming one of a system of keys which control the types; and a ribbon-vibrator operable by all the keys in the system.

13. In a device of the character specified, the combination of type-carriers, keys for operating said type-carriers, said keys including a "blank" key, a carriage, feed mechanism for said carriage, means controlled by said "blank" key for locking the feed mechanism out of operation, means controlled by the remaining keys for releasing the locking means, and a ribbon-vibrator operable by all of the keys.

14. In a device of the character specified, the combination of type-carriers, keys therefor including a "blank" key, a ribbon-vibrator operable by all of said keys, a carriage, feed mechanism for said carriage, a spacing-key for operating said feeding mechanism without printing, means controlled by said "blank" key for locking the feed mechanism out of operation, and means controlled by the remaining type-keys and spacing-key for releasing said locking means.

15. In a type-writing machine, the combination of types, keys therefor, a carriage, a ribbon-vibrator operable by all the keys, carriage-feeding mechanism, a locking-dog for preventing feed of the carriage, a detachable locking-dog support, means operatively connecting said locking-dog with one of said type-keys, and a coöperative locking-abutment movable by the remaining type-keys.

16. In a type-writing machine, the combination of types, keys therefor, a carriage, a ribbon-vibrator operable by all the keys, carriage-feeding mechanism, a movable spring-pressed locking-dog, means operatively connecting said dog to one of said keys, and a coöperative locking-abutment connected to said feeding mechanism.

17. In a type-writing machine, the combination of types, keys therefor, a carriage, a ribbon-vibrator operable by all the keys, a carriage-feeding mechanism, a movable spring-pressed locking-dog controlled by one of said keys, a coöperative locking-abutment associated with said feeding mechanism, and dog-releasing means controlled by the remaining keys.

18. In a type-writing machine, the combination of types, keys therefor, a ribbon-vibrator operable by all the keys, a carriage, a carriage-feeding mechanism, a movable spring-pressed locking-dog, yielding means connecting said dog to one of said keys, the tension of said yielding means being sufficient to overcome the tension of the spring of the locking-dog, and a coöperative locking-abutment connected to the carriage-feeding mechanism.

19. In a type-writing machine, the combination of types, keys therefor, a ribbon-vibrator operable by all the keys, a carriage, a carriage-feeding mechanism, a movable spring-pressed locking-dog, a spring-pressed connection between said locking-dog and one of said keys, and a coöperative abutment connected to the feeding mechanism.

20. In a type-writing machine, the combination of types, keys therefor, a ribbon-vibrator operable by all the keys, a carriage, a carriage-rack, a feed-dog, means for moving one of said rack and dog elements laterally with relation to the other, and means controlled by one of said keys for locking the movable feed element.

21. In a type-writing machine, the combination of types, keys therefor, a ribbon-vibrator operable by all the keys, a carriage, a carriage-rack, a feed-dog, means for moving one of said rack and dog elements laterally with relation to the other, a spacing-key, means connected to one of said type-keys for locking the movable feed element against movement in one direction, and means for releasing said movable feed element by the operation of any of the remaining type-keys or the spacing-key.

FRANZ X. WAGNER.

Witnesses:

ARTHUR M. THOMPSON,
HERMAN L. WAGNER.